Aug. 4, 1959  F. B. CROWLEY  2,897,744
MARGINAL CONTAINER FOR HOUSEHOLD ROASTER
Original Filed Jan. 21, 1954

INVENTOR.
FRANCIS B. CROWLEY
BY Louis Chayka
ATTORNEY.

United States Patent Office 2,897,744
Patented Aug. 4, 1959

2,897,744

MARGINAL CONTAINER FOR HOUSEHOLD ROASTER

Francis B. Crowley, Grosse Pointe Park, Mich.

Original application January 21, 1954, Serial No. 405,285, now Patent No. 2,849,945, dated September 2, 1958. Divided and this application March 14, 1958, Serial No. 721,410

2 Claims. (Cl. 99—339)

This application is a divisional application of my co-pending application Ser. No. 405,285, filed on January 21, 1954, now Patent No. 2,849,945, September 2, 1958.

The container is adapted to be suspended within a cooking vessel, such as an open top roaster, to fit along the wall means thereof but to leave free access from above to the interior space therein.

The need for such a container will be understood in the light of the following explanation:

In cooking meats in the roaster, it is a common practice to place within the roaster various vegetables, such as potatoes. The practice is desirable for the sake of improving the flavor of the vegetables by exposing them to the vapors of the cooked and seasoned meats, and partly for the sake of eliminating the need of additional dishes or other containers for the cooking of said vegetables. However, the practice of cooking the meats and the vegetables in the roaster at the same time also has its disadvantages. In the first place, the space at the bottom of the roaster is ordinarily limited, and, in the second place, a sufficient quantity of a gravy composed of the juices of the cooked meat, water, fats, and seasoning must be allowed to accumulate in the roaster for best cooking results. The gravy is customarily used for basting, which means that the gravy accumulated at the bottom of the roaster has to be withdrawn and poured over the top portions of the meat to prevent its drying out. However, vegetables placed within the gravy will absorb it to the extent that little or nothing will be left for basting, while they themselves will become soggy.

It is in order to overcome these disadvantages that I have developed my marginal container, or marginal means of support of food items to be cooked in roasters or similar vessels for cooking food.

A further object of my invention is to make the container removable, light in weight, and to provide it with means for its suspension from the rim portion of the vessel in which it is to be used, or with means of support from below.

Finally, my object is to produce a container of simple construction and one which may be produced at a low cost.

I shall now describe my marginal food-supporting container with reference to the accompanying drawings in which.

Similar numerals refer to similar parts throughout the several views.

Figure 1:
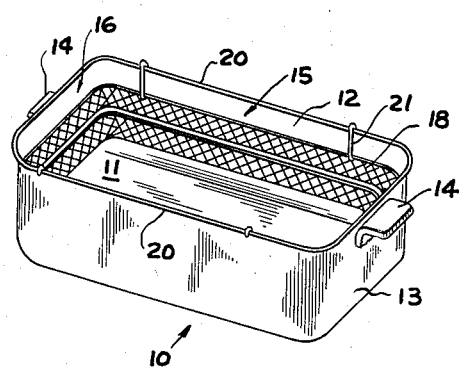
Fig. 1 is a perspective view of a roaster, with a perspective view of my container in its operative position therewithin.

The roaster shown in Fig. 1 and identified by numeral 10 is of a conventional, substantially-rectangular form, open at the top but adapted to receive a cover, which is not shown. The roaster includes a flat bottom 11, two upright side walls 12, and two end walls 13, each of the latter being provided with a handle 14.

Figure 2:
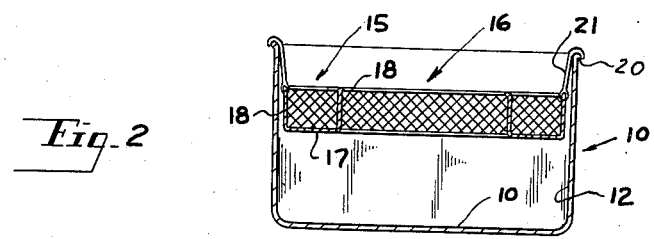
Fig. 2 is a vertical sectional view of the same roaster and the said container which is shown in Fig. 1.

The removable supplemental food container which is to fit into the roaster has the form of a trough, preferably made of wire in the manner of a basket. More specifically, the container shown in Figs. 1 and 2 consists of two side units 15 in parallel relation to each other and two transverse units 16 joined to said side units so as to complete a quadrangle of a size to fit into the interior of the roaster.

Each of the component units includes a bottom portion 17, which may be horizontal or substantially horizontal, and two side walls 18. As the container is to be suspended from the upper rim 20 of the roaster, the outer side walls 18 of said container are provided with hooks 21 which may be applied over said rim 20. The hooks are of such length as to hold the container at or below the level of the upper rim of the roaster, while the bottom portion 17 of the container is at a level above the bottom 10 of said roaster.

As each of the side units 15 and the end members 16 of the trough are relatively narrow, they hug the inner surface of the roaster, but leave a large rectangular open space over the central portion thereof. The area of the open space or opening formed between the inner walls of the spaced side units of the supplemental food container is greater than the area of the supplemental food container. This is well illustrated in Fig. 1 where in spite of the basket-like marginal container disposed therein the bottom of the roaster is amply visible even when viewed from some distance and at an angle.

Figure 3:
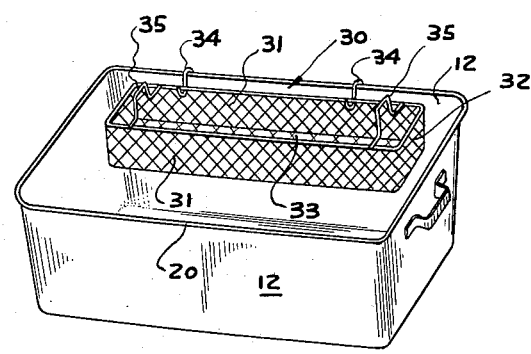
Fig. 3 is a perspective view of a roaster in which the removable marginal container is of a modified species.

The specimen of the container shown in Fig. 3 is limited in size to fit only along one wall of the roaster. Thus, the container or a basket has the form of a single, straight-line trough 30 including two side walls 31, two end walls 32, and a horizontal bottom 33. In this form the trough is adapted to be suspended from one side wall 12 of the roaster by means of hooks 34 which are a part of the basket and which are adapted to fit over the rim 20 of the roaster.

As in the roaster shown in Fig. 1, the container is suspended in the roaster in a position in which the bottom of the container is raised over the bottom of the roaster.

For the purpose of lifting the basket out of the roaster, I have provided it with a pair of wire handles 35, each of them being applied crosswise to the side walls of the basket at the respective end portions thereof.

It will be understood that the container may also be made of sheet stock having enough perforations in the bottom and in the side walls to have the contents thereof well exposed to the heat within the roaster, or that it may be made partly of wire screen stock and partly of sheet metal stock.

As for the shape of the roaster, it will be understood that there is nothing critical therein and that it may be rectangular, as shown in the drawings, or that it may have an oval shape as seen from above, or a circular shape. Obviously, the outline of the container adapted to fit into a particular roaster would have to conform to its specific shape.

After having described my container, what I wish to claim is as follows:

1. In combination with a main food cooking vessel open at the top thereof, the upper edge thereof defining a rim, a supplemental food container removably disposed within the vessel at a level below the rim and at a distance above the bottom of the vessel, said supplemental food container comprising connected spaced opposed side food receiving units, each unit including a bottom wall and spaced inner and outer side walls extending upwardly from the bottom wall, the inner walls of said units being spaced from each other to provide a central opening, permitting access to and inspection of the food in the bottom of the main food cooking vessel, the area of said opening being greater than the area of the supplemental food container, said units having openings formed therein, permitting the vapors from the food being cooked in the main vessel to permeate the food into the supplemental food container, and suspension hooks extending upwardly from the upper edge of the outer side walls of said supplemental food container engaging with the rim of the main food cooking vessel.

2. In combination with a main food cooking vessel open at the top thereof, the upper edge thereof defining a rim, a supplemental food container removably disposed within the vessel at a level below said rim and at a distance above the bottom of the vessel, said supplemental food container comprising a pair of spaced opposed side food receiving units and an interconnecting end unit, each unit including a bottom wall and spaced inner and outer side walls extending upwardly from the bottom wall, the side units being so spaced from each other to provide a central opening, permitting access to and inspection of the food in the bottom of the main food cooking vessel, the area of said opening being greater than the area of the supplemental food container, each of said units having openings formed in the bottom and side walls thereof permitting the vapors from the food being cooked in the main vessel to permeate the food in the supplemental food container, and suspension hooks extending upwardly from the upper edge of the outer side walls of the side units of the supplemental food container engaging with the rim of the main food cooking vessel.

References Cited in the file of this patent

UNITED STATES PATENTS

| | | |
|---|---|---|
| 201,139 | Weller | Mar. 12, 1878 |
| 505,360 | Hilliard | Sept. 19, 1893 |
| 1,512,744 | Calder | Oct. 21, 1924 |
| 1,582,685 | Pence | Apr. 27, 1926 |
| 1,938,169 | Barr | Dec. 5, 1933 |
| 2,000,944 | Gilbert | May 14, 1935 |
| 2,282,847 | Bariffi | May 12, 1942 |
| 2,740,349 | De Gonia | Apr. 3, 1956 |